United States Patent [19]

Nemedi

[11] Patent Number: 5,106,487
[45] Date of Patent: Apr. 21, 1992

[54] PARTS SEPARATOR DEVICE FOR SEPARATING HEAVY MATERIALS FROM CHIPS AND LUBRICANTS

[75] Inventor: Willilam D. Nemedi, Vicksburg, Mich.

[73] Assignee: Inter-Source Recovery Systems, Inc., Kalamazoo, Mich.

[21] Appl. No.: 521,598

[22] Filed: May 10, 1990

Related U.S. Application Data

[63] Continuation-in-part of Ser. No. 385,674, Jul. 26, 1989, abandoned.

[51] Int. Cl.$^5$ .............................................. B07B 4/02
[52] U.S. Cl. ..................................... 209/12; 209/133; 209/136; 209/149; 209/631
[58] Field of Search ................... 209/20, 12, 628, 631, 209/136, 137, 138, 139.1, 145, 149, 157, 133, 638, 639

[56] References Cited

U.S. PATENT DOCUMENTS

| | | | |
|---|---|---|---|
| 36,980 | 11/1862 | Irvin . | |
| 485,571 | 11/1892 | Barnard . | |
| 913,377 | 2/1909 | Grant . | |
| 1,003,138 | 9/1911 | Hupner . | |
| 1,126,240 | 1/1915 | McKenzie . | |
| 1,272,311 | 7/1918 | Plaisted . | |
| 1,288,785 | 12/1918 | Williams . | |
| 1,300,799 | 4/1919 | Williams . | |
| 1,306,775 | 6/1919 | Roberts . | |
| 1,362,973 | 12/1920 | Vardell . | |
| 1,376,190 | 4/1921 | Dean . | |
| 1,418,866 | 6/1922 | Dennig . | |
| 1,421,731 | 7/1922 | Shelton . | |
| 1,517,595 | 12/1924 | Stebbins . | |
| 1,579,660 | 4/1926 | Reilly . | |
| 1,597,261 | 8/1926 | Bishop . | |
| 1,669,235 | 5/1928 | Fenton . | |
| 1,781,790 | 11/1930 | McKenzie . | |
| 1,888,372 | 11/1932 | Bramwell . | |
| 1,987,640 | 1/1935 | Rothgarn | 209/136 |
| 2,000,181 | 5/1935 | Lessing et al. | 209/139 |
| 2,140,827 | 12/1938 | Boag | 209/26 |
| 2,162,392 | 6/1939 | Solomon et al. | 209/137 |
| 2,186,107 | 1/1940 | Eissmann | 209/139 |
| 2,203,821 | 6/1940 | Hinchman | 209/29 |
| 2,203,959 | 6/1940 | Hammack . | |
| 2,210,103 | 8/1940 | Stoner | 209/12 |
| 2,267,326 | 12/1941 | Eissmann | 209/136 |
| 2,356,465 | 8/1944 | McKenzie | 209/136 |
| 2,585,301 | 2/1952 | Doss | 19/76 |
| 2,681,476 | 6/1954 | Van Doorn | 19/76 |
| 2,681,477 | 6/1954 | Van Doorn | 19/76 |
| 2,692,047 | 10/1954 | Frevert | 209/139 |
| 2,731,151 | 1/1956 | Hopper | 210/68 |
| 2,906,466 | 9/1959 | Hopper | 241/34 |
| 2,908,391 | 10/1959 | Frevert | 209/315 |
| 3,356,213 | 12/1967 | Weber | 209/118 |
| 3,360,125 | 12/1967 | Horsey | 209/12 |
| 3,400,814 | 9/1968 | Hobbs | 209/20 |
| 3,441,131 | 4/1969 | Gebauer | 209/3 |
| 3,630,353 | 12/1971 | Seidel | 209/11 |
| 3,655,043 | 4/1972 | Wochnowski et al. | 209/138 |
| 3,799,339 | 3/1974 | Breitholtz et al. | 209/115 |
| 3,836,085 | 9/1974 | Brown | 241/19 |
| 3,888,352 | 6/1975 | Kulseth | 209/115 |
| 4,219,410 | 8/1980 | Herder | 209/143 |
| 4,293,408 | 10/1981 | Herder | 209/638 |
| 4,310,417 | 1/1982 | Dudley et al. | 210/375 |
| 4,382,858 | 5/1983 | Dudley | 209/136 |
| 4,424,891 | 1/1984 | Dudley et al. | 193/2 R |
| 4,441,995 | 4/1984 | Dudley | 209/137 |
| 4,772,380 | 9/1988 | Cramer et al. | 209/2 |

FOREIGN PATENT DOCUMENTS

| | | | |
|---|---|---|---|
| 506578 | 10/1954 | Canada . | |
| 2636989 | 2/1978 | Fed. Rep. of Germany . | |
| 814485 | 3/1981 | U.S.S.R. | 209/631 |

*Primary Examiner*—Donald T. Hajec
*Attorney, Agent, or Firm*—Marshall, O'Toole, Gerstein, Murray & Bicknell

[57] ABSTRACT

A separator device for separating out heavy materials from metal chips and lubricant, in which the separaton may be viewed by an operator while the separation process is in operation at a drop-out opening in the separator. The invention further permits heavy, undesired objects to be separated in an open chute first member whereas second stage separation is accomplished by a substantial fluid pressure sufficient to entrain chips and lubricant and transport the entrained chips and lubricant along the length of a second chute member to a centrifuge where the lubricant is separated from the chips.

26 Claims, 8 Drawing Sheets

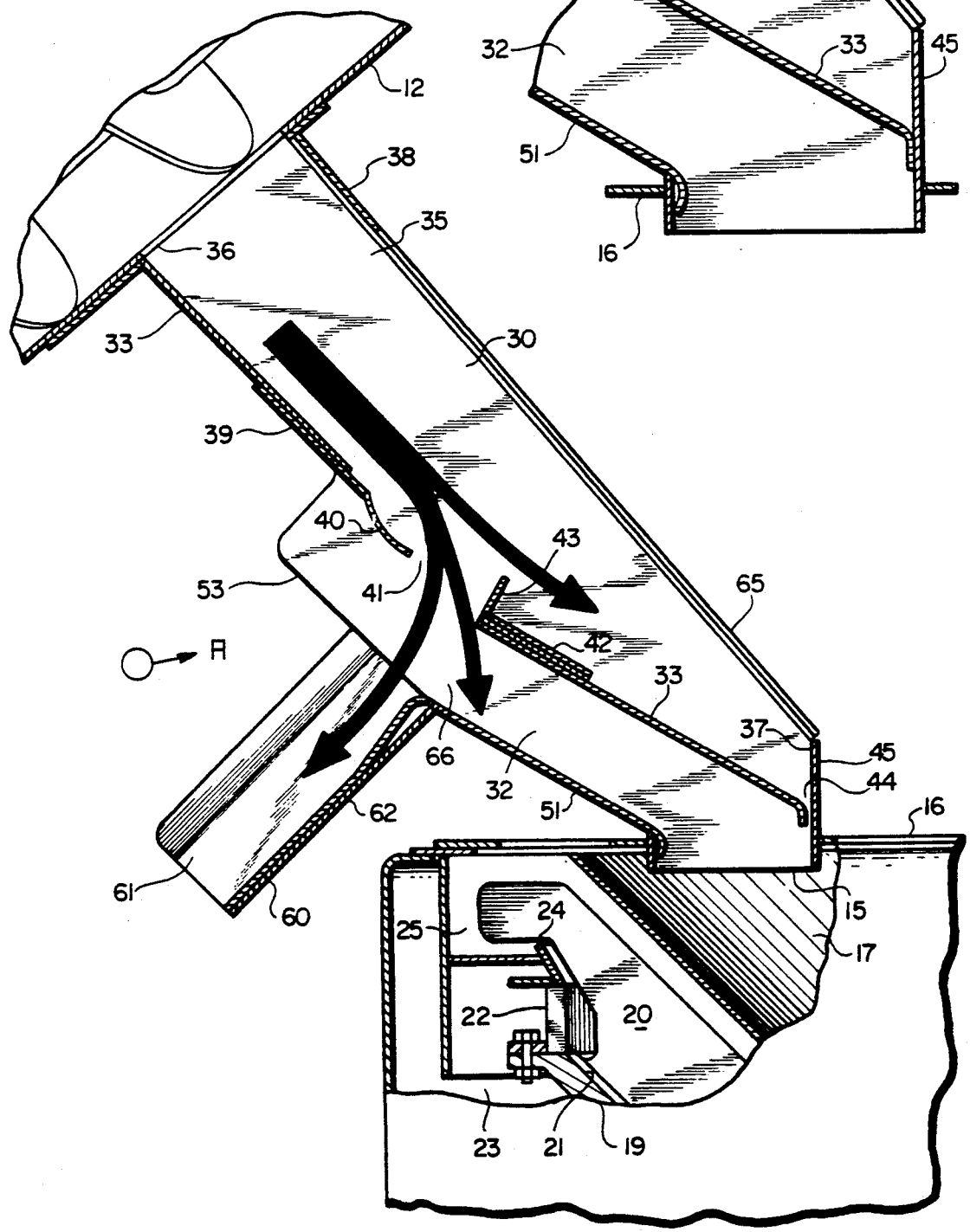

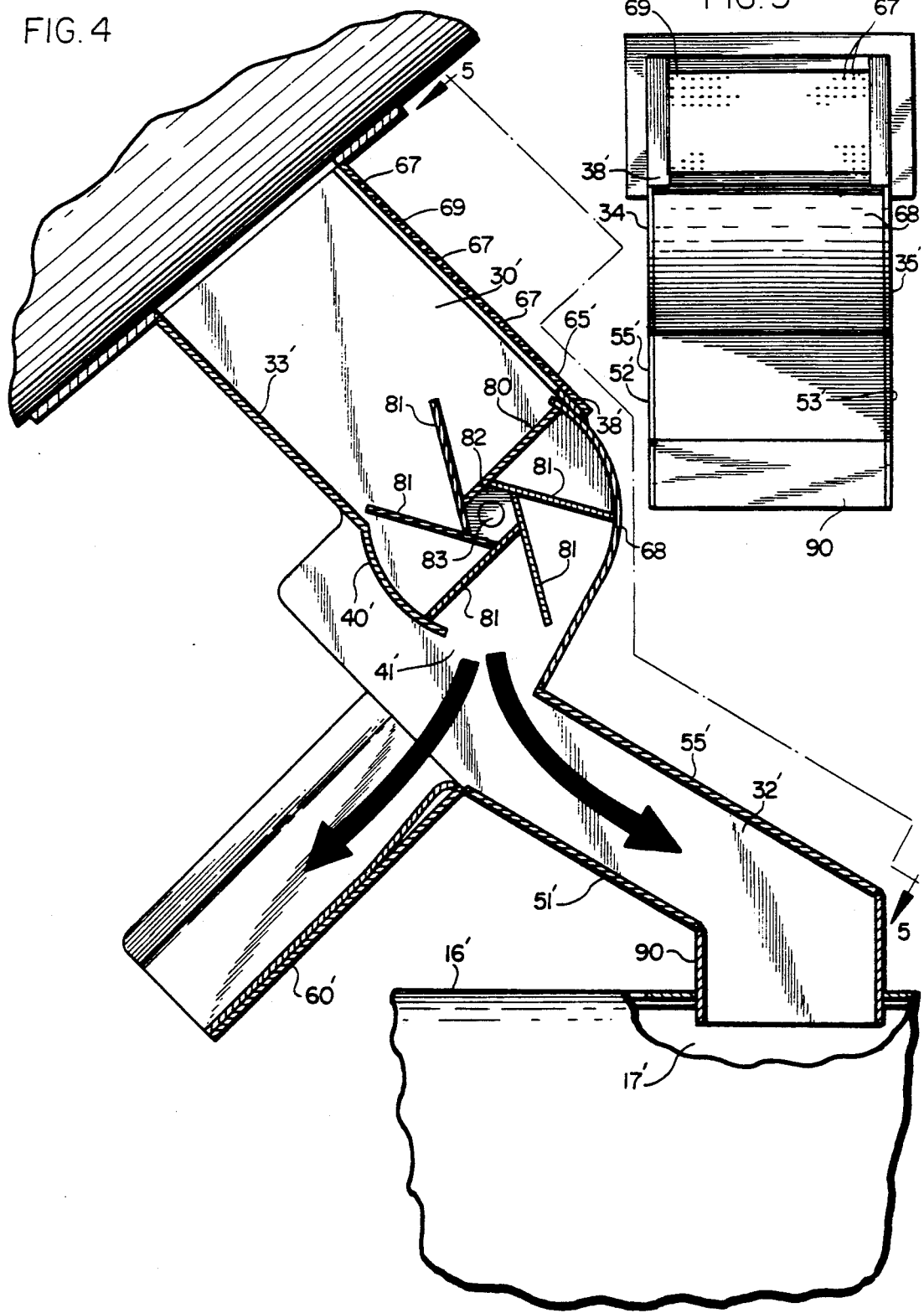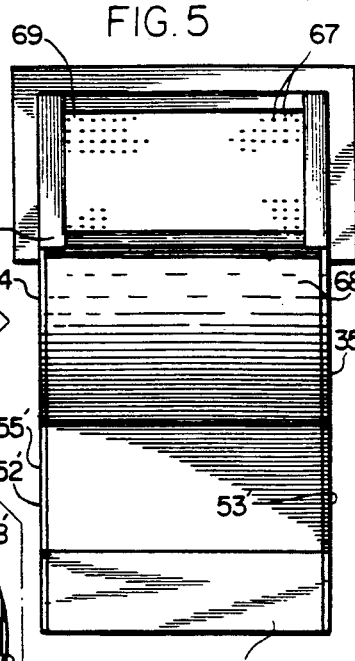

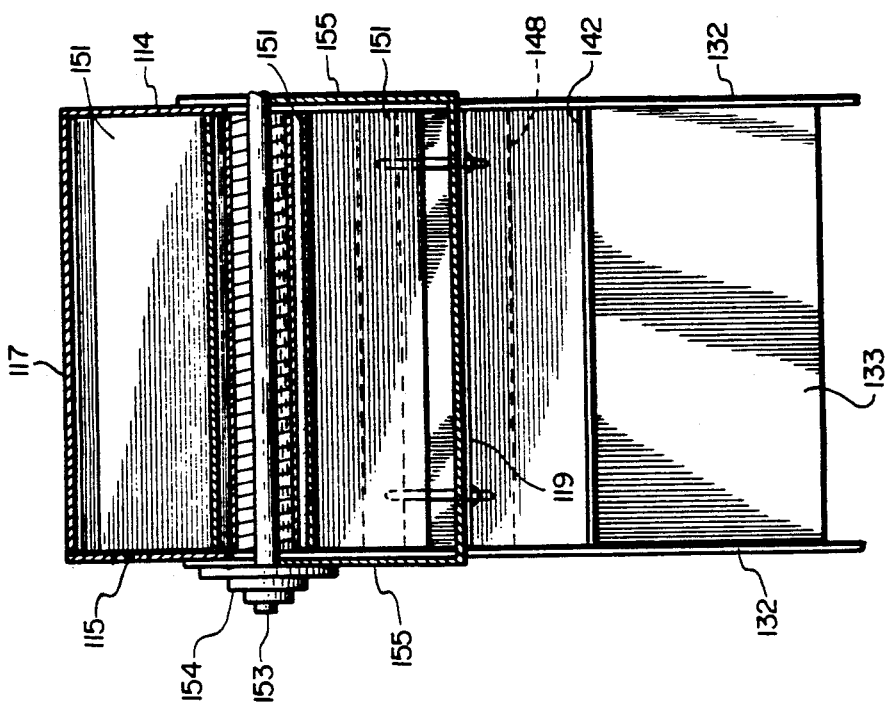
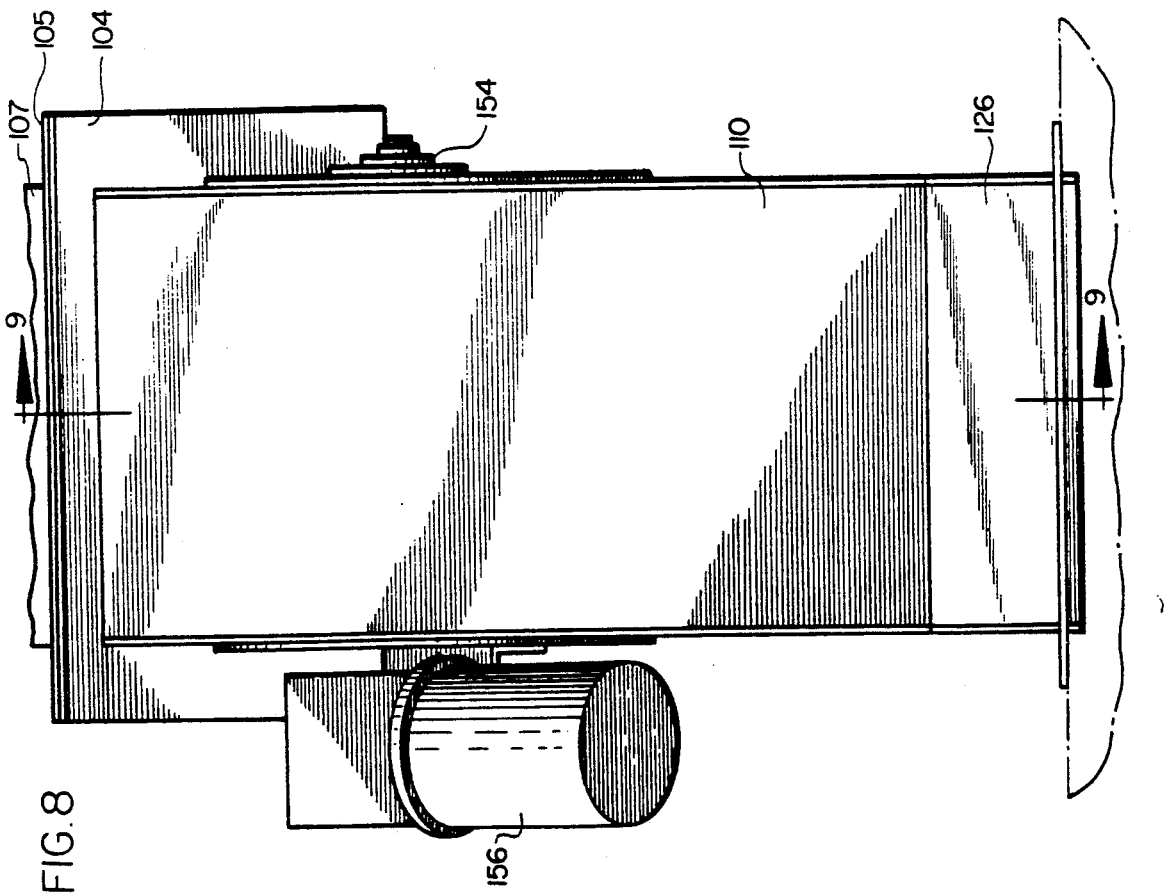

PARTS SEPARATOR DEVICE FOR SEPARATING HEAVY MATERIALS FROM CHIPS AND LUBRICANTS

This is a continuation-in-part application of application Ser. No. 07/385,674 filed Jul. 26, 1989 now abandoned.

FIELD OF INVENTION

The invention disclosed and claimed herein relates generally to the separation of undesired, large and heavy materials from a mixture of smaller materials and fluids such as metal chips and lubricating oils, and, more specifically, to a separator device and system in which material separation is readily viewable to an operator while the device is in operation. The invention also includes structure which permits multi-stage material separation to occur prior to entry of the separated materials into the receiving end of a chute member where the separated chips and fluids are substantially entrained as they travel to a centrifugal separator or other device.

BACKGROUND OF THE INVENTION

It is known to have systems for separating fluids from other materials such as the separation of metal chips from lubricating oil which are generated in the course of machining operation on a lathe, mill, etc. One system known in the art is disclosed in U.S. Pat. No. 4,310,417. The '417 patent is directed to a system for separating heavy metal parts prior to the entry of metal chips and oil into a centrifuge separator where the oil is separated from the relatively light metal chips.

While the materials separation system disclosed in the '417 patent is satisfactory in many applications, it has been found deficient in certain applications. In some instances, heavy metal pieces, bars and relatively long pieces of metal such as bar stock do not separate from the lighter metal chips, but instead, are carried to the centrifugal separator where damage occurs to the machine's blades or other parts of the centrifuge.

In operation, the prior art separation system of the '417 patent generally feeds materials to be separated down an inclined chute. A blast of air is pulled upward through an opening in the bottom wall of the chute to provide a vehicle for separating materials in the chute. The air serves to entrain and separate lighter materials from heavier materials and the heavier, undesired materials fall out the drop-out opening.

Unfortunately, the blast of air, which is either blown or pulled into the drop-out opening, is not always satisfactory to provide the desired entrainment and consequent separation. As a result, proper separation does not occur and heavy scrap materials pass into the centrifuge separator. It is believed the separation in the system provided in the '417 patent occurs against gravity, that is, a column of air enters the drop-out opening in the bottom wall of a chute and directs the material to be separated vertically upward—against gravity. If the column of air is not satisfactory for whatever reason, proper separation does not occur.

Another disadvantage sometimes found with the system of the '417 patent is that the material separation occurs in a closed chute such that one cannot view material separation as it occurs. It is not until a problem arises that one is able to deduce that proper separation at a particular location has not occurred; and, by the time it is discovered, damage has already been done to the centrifuge. Moreover, it is difficult to ascertain the requisite air needed for a particular separator application inasmuch as the separation cannot easily be viewed by an operator. As a result, it often takes an inordinate amount of time to insure proper separation.

Other separator devices are available. One is a device disclosed in Fern U.S. Pat. No. 773,556. Coal, bone and rock travel down an open, inclined chute. Prior to material reaching the discharge end of the chute, the material passes over a hinged retarding plate which impedes or retards the movement of the softer foreign substances and reduces its momentum. A blower for buoying the material discharged from the chute is secured to the moveable retarding plate. Accordingly, material passing down the open chute is slowed and allowed to drop off the edge of the chute where it contacts blown air. The material separates and the coal, bone and rock pass to various open chutes. This system slows material prior to discharge from the feed chute, which is disadvantageous. Rather, it is desired that material gain momentum as it approaches the discharge so that the material utilizes the momentum as it approaches a material drop-out opening.

It is important to have the generation of a positive or negative air flow for a system not only to assist the separation of materials in an open area, but also to assist in carrying separated, entrained chips and fluid along the length of a closed chute to a centrifugal separator device.

What is desired is to have a materials separation system in which improved separation occurs by obviating problems that presently exist. One desire is to have a parts separation system in which the parts to be separated are not required to act against the force of gravity in separation, but, rather, gravity is utilized to assist in the separation of materials. Further, it is desired to have a parts separation system in which an operator is able to view the separation of materials prior to entry of the separated materials into a chute member which leads or connects to a machine such as a centrifuge separator.

Further, it is desired to have a system in which material separation is carried out in multiple stages such that several opportunities exist to remove undesired materials from the system. Finally, it is desired to have a multiple-stage separation system in which the separation device is not an entirely closed device, but, rather, the device is open whereby an operator can view each separation phase as it occurs which affords a better opportunity to control and adjust the material separation procedure.

SUMMARY OF THE INVENTION

The system and apparatus of the present invention serve to eliminate the above described problems and to achieve those advantages desired in a materials separation system.

Briefly, the invention disclosed and claimed herein relates to a separator system and apparatus in which the separation can be readily easily viewed by an operator while the device is in operation. Further, the system disclosed herein utilizes gravity to assist in the various phases of separation as opposed to prior art systems where the materials to be separated must be lifted to overcome gravity in the separation process.

Briefly, the separator apparatus and system disclosed and claimed herein employs first and second chute members in which the second chute member is at least partially below the first chute member. The first chute member, which normally is in an inclined position, is adapted to receive materials to be separated at the material receiving end of the first chute member. Materials pass to a drop-out opening upon leaving the first chute member. The second chute member has a material receiving opening contiguous to the material drop-out area. A fluid pressure, which is generally created by either a substantial positive or negative air flow, traverses the area immediately below the drop-out opening and either pulls or directs fluid, such as air, to the second chute material receiving opening. Material to be separated falls by gravity out of the drop-out opening where it is entrained in the fluid stream. Light particles of material such as chips and lubricant are captured in the fluid train while undesired, heavier, and oftentimes, larger materials are separated out and fall into a material catch means.

The air-entrained separation occurs substantially outside the opening to the second chute member such that separation can be viewed by an operator while the system is in operation.

In one embodiment of the invention, the materials pass to the drop-out opening at which location unwanted long pieces such as bar stock will be directed over the drop-out opening in the bottom wall of the first chute member and passed to a collection area located in the first chute member adjacent the remaining first chute end. Similarly, the first chute member need not be entirely closed such that material separation, which can occur in the first chute, also is readily viewable by an operator.

What is achieved by the invention of the present application is a material separation system which utilizes apparatus that allows for improved material separation which may be viewed by an operator who may readily adjust the material separation while the apparatus is in operation. The separation stage also takes advantage of the effect of gravity, and in one embodiment of the invention, multiple stage separation occurs with all stages being viewable by an operator.

Further advantages will become apparent from the following description of the drawings and detailed description of the invention.

DESCRIPTION OF THE DRAWINGS

FIG. 2 shows a fragmentary, side section view of the multi-stage separator device of FIG. 1;

FIG. 3 shows a fragmentary, section view of the first and second chute members disposed relative to a centrifugal separator with the bottom wall of the first chute member end closed at the end opposite the receiving end;

FIG. 4 shows another embodiment of the multi-stage separator device of the present invention with a rotary air-seal means in the first chute member positioned over a drop-out opening;

FIG. 5 shows a plan view of the multi-stage parts separator device taken along lines 5—5 in FIG. 4;

FIG. 8 shows a fragmentary plan view of the separator device of FIG. 7;

FIG. 10 shows a section view taken along lines 10—10 in FIG. 9 showing paddle blades adapted to sweep materials entering the separator from a conveying means toward a material drop-out opening; and, FIG. 11 shows the embodiment of FIG. 9 except the parts separator device is connected to a centrifuge separator which is utilized to generate a negative air pressure in the second chute member and the air flow across the drop-out opening.

DETAILED DESCRIPTION

Figure 1:
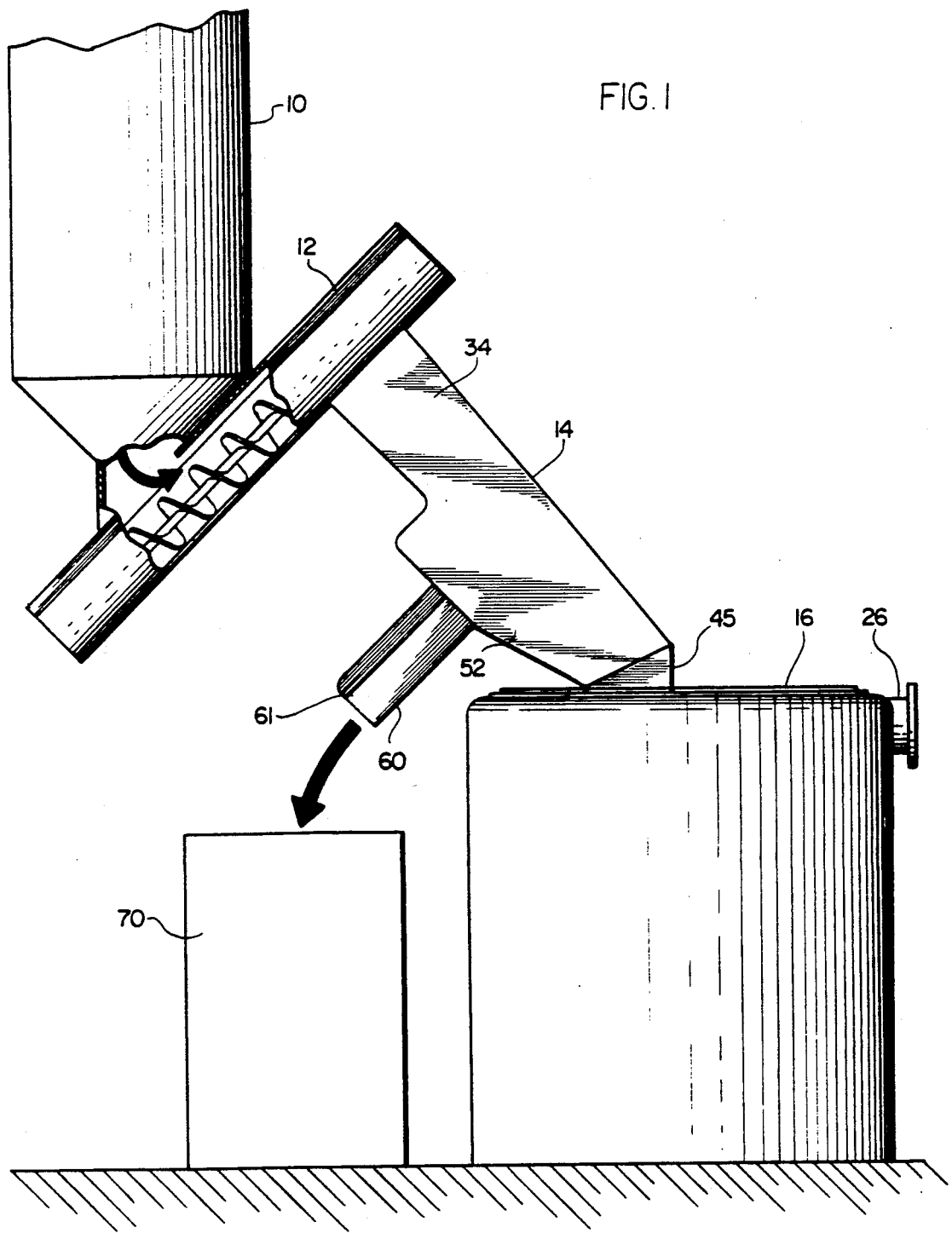
FIG. 1 shows the material separation system of the present invention including a multi-stage separator device connected at one end to a conveyor feeding means and at the opposite end to a centrifugal separator device.

Referring to FIGS. 1 and 2, a mixture of scrap materials, such as metal chips, lubricating oils and relatively large, unwanted, pieces of metal, is received in hopper 10 and discharged into one end of a conventional trough-type or belt-type conveyor 12. While reference is made herein to lubricant, it is appreciated the term is used in its broad sense to include any liquid material to be separated from lighter metal or plastic chips and includes lubricating oils, fluids or the like.

The conveyor auger or belt transports the mixture to the upper end of the conveyor and discharges the material into a multi-stage separator device 14. Following separation in device 14, the scrap materials are discharged through exit 15 into centrifugal separator 16. As illustrated in FIG. 2, the material drops through guide cone 17 to the bottom of an inverted, rotatable, conical drum or rotor 19 having a plurality of radially positioned, equally-spaced blades 20 attached thereto. The rotor is driven by a conventional motor, not shown. Rotation of drum 19 and blades 20 causes the mixture to rotate also. A centrifugal force is generated in a known manner to cause the material to move upwardly along the interior of the conical side wall 21 of the rotor 19. As the material reaches the wedge wire screen 22, oil is separated from the chips, passes through screen 22 where it is collected in the annular chamber 23 for discharge through a suitable conduit, not shown. The metal chips continue upward, partly in response to the centrifugal force already acquired and partly in response to air drawn through the machine 16, past screen 22 to the upper edge 24 of the drum 19 and are centrifuged into annular chamber 25. The chips then are thrown and blown out of annular chamber 19 through tangential exit 26 which is connected to a suitable chip receiving means.

The utilization of a centrifugal separator device such as separator 16 is well known in the art; and, conventional separator devices are disclosed, for example in U.S. Pat. Nos. 4,137,176, No. 4,382,858 and No. 4,310,417.

Parts separator device 14 comprises a first chute member 30 and a second chute member 32 disposed below member 30. First chute member 30 extends in a first direction away from conveyor 12 as seen, for example, in FIGS. 2, 4, 6, 9 and 11. First chute member 30 includes a rectangular-shaped sheet metal member comprising bottom wall 33, spaced side walls 34, 35, first and second ends 36, 37 and a top wall 38, which is open for a substantial distance between ends 36, 37.

Bottom wall 33 includes a fixed or movable plate 39 having an arcuate-shaped underarm section 40 positioned adjacent a material drop-out opening 41. Material drop-out opening 41 is spaced away from the entrance or receiving end 36 of the first chute member and is located along the bottom wall of the first chute member.

A deflector plate 42 having an upright arm extension 43 is disposed on the side of drop-out opening 41 opposite underarm section 40. Bottom wall 33 terminates contiguous to tubular chute 45, which is seated in guide cone 17 of centrifuge 16, to form a small opening 44 disposed between the end of wall 33 and tubular chute 45.

Second chute member 32 is disposed below chute member 30 and extends in the same first direction as chute member 30 and is a rectangular-shaped sheet metal member which includes bottom wall 51, spaced side walls 52, 53 connected to and extending upward from bottom wall 51. As seen in FIGS. 1 and 2, chute side walls 52, 53 are coextensive with side walls 34, 35 respectively. Further, the top wall of second chute member 32 is part of the bottom wall 33 of first chute member 30.

Catch means 60 comprises a substantially U-shaped sheet metal member and includes spaced side walls 61 connected to bottom wall 62. Catch means 60 serves to receive materials separated from metal chip materials being fed to centrifuge 16.

It will be observed that the side walls 61 of catch member 60 depend from and are coextensive with the side walls 52, 53 of the second chute member 62 and that the bottom wall 62 depends from one end of bottom wall 51.

In operation, material to be separated such as heavy or long metal pieces, metals, chips and lubricating oils are fed into the material receiving end 36 of first chute member 30 by conveyor means 12. The mixture slides, by gravity, down inclined bottom wall 33 where it drops through drop-out opening 41. Prior to arriving at opening 41, unwanted pieces of material such as gross sizes of bar stock, etc. drop onto arcuate underarm section 40 and are directed over opening 41 and vertical plate 43. The gross-sized materials are separated from the mixture and pass to end 37 of first chute member 30. This material may be removed through opening 65 in top wall 38. Additionally, as shown in FIG. 2, an operator may view the first stage separation occurring within first chute member 30 through opening 65.

Excess lubricating oil that may separate from the mixture in chute member 30 is permitted to flow along the top surface of bottom wall 33 through opening 44 where the fluid drops into centrifuge 16.

Following separation of materials in the first chute member, the mixture passes through drop-out opening 41 to the open, material receiving end 66 of chute 32. The second chute member 32, as seen, for example, in FIG. 2, extends in the first direction from the entrance or material receiving end 66 of chute member 32 and extends outwardly away from the material drop-out opening in the first chute member to form a space between the drop-out opening and the second chute member entrance end with at least a portion of the space being viewable by a viewer.

As the material drops past material receiving open end 66 formed in second chute member 32 by side walls 52, 53, top wall 33 and bottom wall 51, the mixture of metal and oil is entrained in an air flow having an air pressure substantially different than normal atmospheric air pressure. In the instance of the embodiment of FIG. 1, the air flow is generated by centrifuge 16 whereupon actuation of the centrifuge device, air is pulled or drawn into the centrifuge 16 and a negative air pressure is generated in second chute member 32. The centrifuge can be powered to have a motor sufficient to generate movement of rotor 19 and blades 20 to provide the desired air flow past drop-out opening 41 as a negative pressure occurs within chute member 32.

The change in air flow immediately below drop-out opening 41 serves to cause lighter metal chips and lubricant to pass into second chute member 32 whereas heavier, undesired chips fall by gravity into catch means 60 where they pass to hopper 70. The lighter metal chips and lubricant entrained in the second chute following separation of the heavier materials pass or are transported to the centrifuge where the lubricant is separated from the chips.

The separation of materials in the second stage occurs substantially outside end 66 of chute member 32 such that the separation process is visible to an operator or other interested person viewing the operation in the direction of arrow A in FIG. 2 while the separation system is in process.

Utilizing the multi-stage separation apparatus of the present invention allows for materials to be separated in several stages thereby decreasing the possibility of damage to the centrifuge. Moreover, each phase of separation is readily viewable by appropriate personnel, while the system is in operation, so that it can readily be determined whether efficient separation occurs and any necessary adjustments can be relatively easily made.

It has been found that to increase the air flow at the entrance 66 to the second chute member, it is sometimes desired to close off the possibility of any substantial air being pulled in the first chute member 30 through drop-out openings 41 or 44. To obviate this concern, opening 44 can be eliminated as illustrated in FIG. 3 wherein wall 33 has been extended to contact the wall of chute 45.

Additionally, an air-seal means 80 can be provided to preclude air or other fluid from passing through drop-out opening 41. Referring to the embodiment shown in FIG. 4, first chute member 30' comprises bottom wall 33', spaced side walls 34', 35' and top wall 38' having an opening 65' disposed therein. If desired, a perforated plate 69 having perforations 67 can be positioned over opening 65'. The plate is not required for operation of the system; however, in some instances, it is required by regulatory agencies to have a substantially closed chute. The plate is removable in order that an operator may view the first stage separation occurring in first chute member 30'.

Arcuate section 68 has one end which extends from and is fastened by welding or other suitable means to one end of wall 38'. The remaining end of section 68 contacts and terminates as one end of second chute member top wall 55'. Bottom an arcuate-shaped underarm section 40' extending therefrom.

Second chute member 32' comprises bottom wall 51', spaced side walls 52', 53', and top wall 55' connected to vertical chute 90 which feeds into cone 17' of centrifuge 16'.

A rotary air-seal means 80 is seated in first chute member 30' and is disposed above and contiguous to drop-out opening 41'. The rotary air-seal comprises a plurality of equally-spaced blades 81 connected to hub 82 which is disposed for rotation on rotatable shaft 83. Shaft 83 is connected to a motor or other suitable drive means, not shown. The outer edges of blades 81 cooperate with and contact the inner surfaces of arcuate-shaped underarm section 40' and section 68 sufficient to create an air-seal or lock to preclude any substantial amount of air from being pulled through opening 41' into centrifuge 16'.

Figure 6:
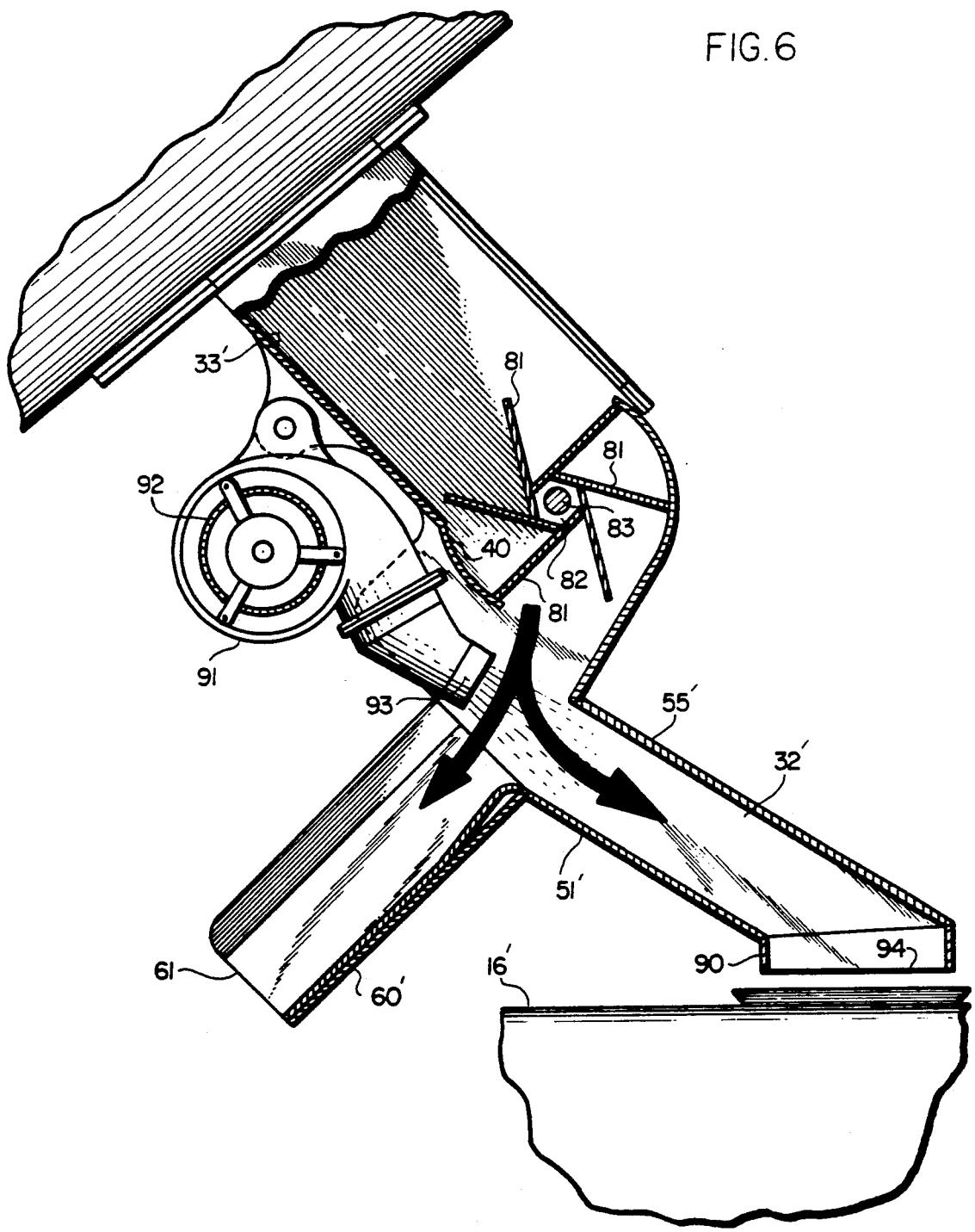
FIG. 6 shows the embodiment of FIG. 4 except a blower is utilized to generate a positive air-flow in the second stage separation.

FIGS. 1-5 disclose embodiments in which the air flow across drop-out opening 41 is generated by actuation of centrifugal separator device 16 which pulls air into the centrifuge such that a negative air pressure exists in second chute member 32. It is appreciated, however, that the requisite air flow could be generated by a positive increase in the air pressure in chute member 32 and across drop-out area 41. A positive air pressure can be achieved, as shown in FIG. 6, by a conventional, positive blower device 91 having a motor 92 and a blower section 93 disposed below and across underarm section 40 which, when actuated, creates a positive air pressure across drop-out opening 41 and in chute 32 sufficient to entrain materials falling through opening 41. Blower 91 can be attached by any suitable means such as fasteners, not shown, to bottom wall 33. The exit end 94 of the second chute member can be disconnected from separator 16'.

While the cascade-type parts separator device shown herein is shown as comprising two stages, it is appreciated that a system could be employed by a person of ordinary skill in the art in which additional separation stages were utilized.

Figure 7:
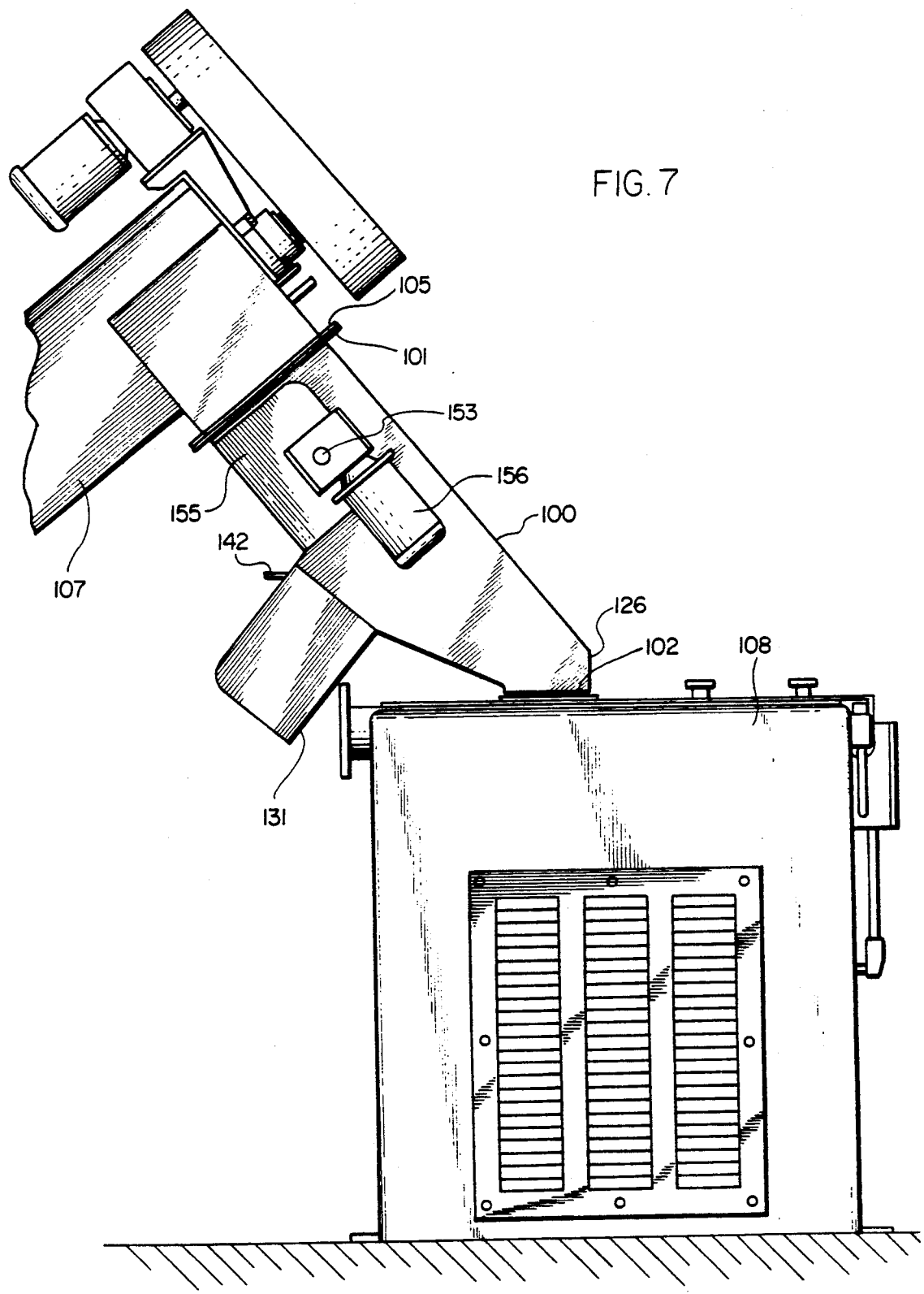
FIG. 7 shows a side, fragmentary view of a further embodiment of a separator device of the present invention connected at one end to a conventional conveyor feeding means and at the opposite end to a conventional centrifugal separator device.
Figure 9:
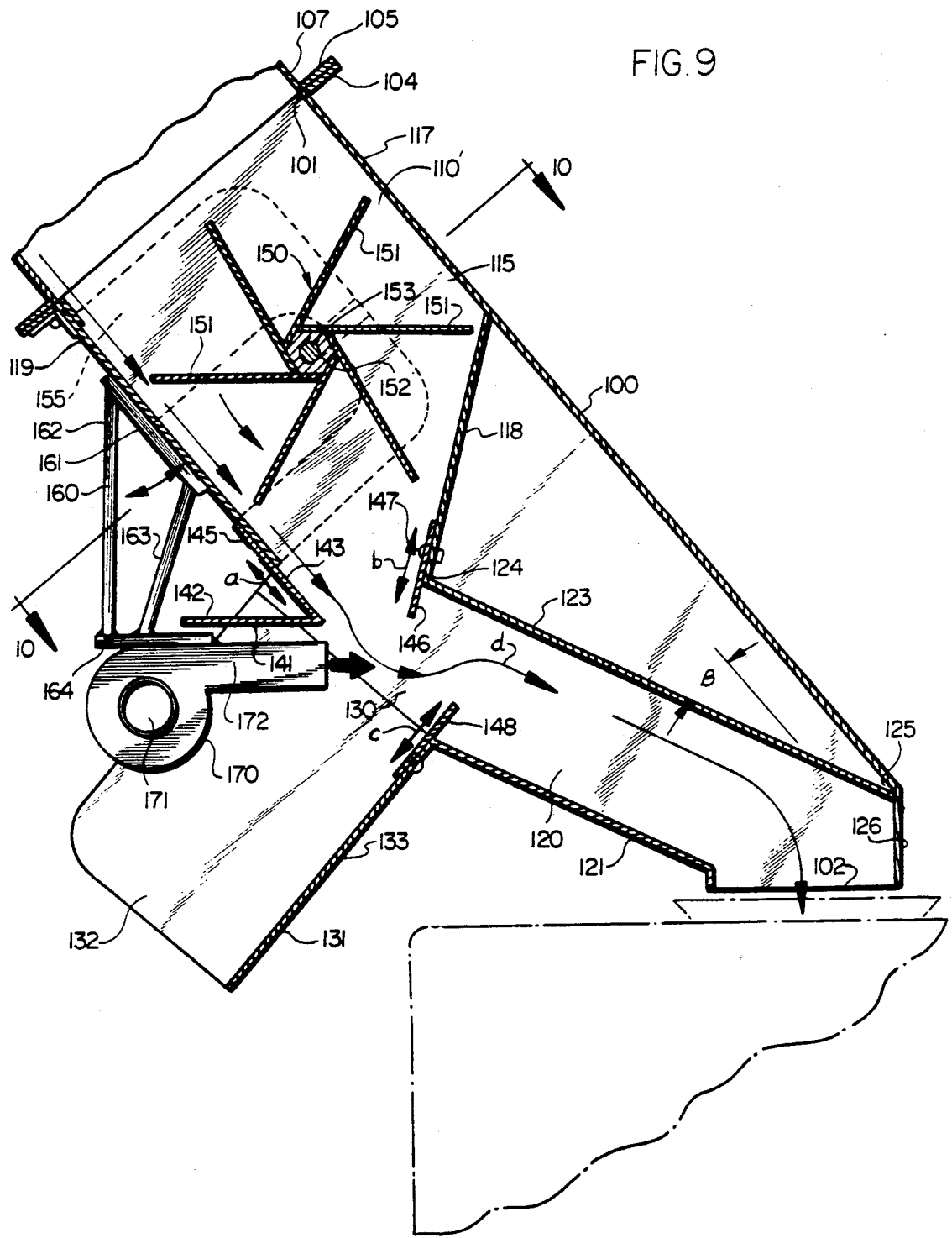
FIG. 9 shows a fragmentary, side section view taken along lines 9—9 in FIG. 8 of the separator device of FIG. 7.
Figure 11:
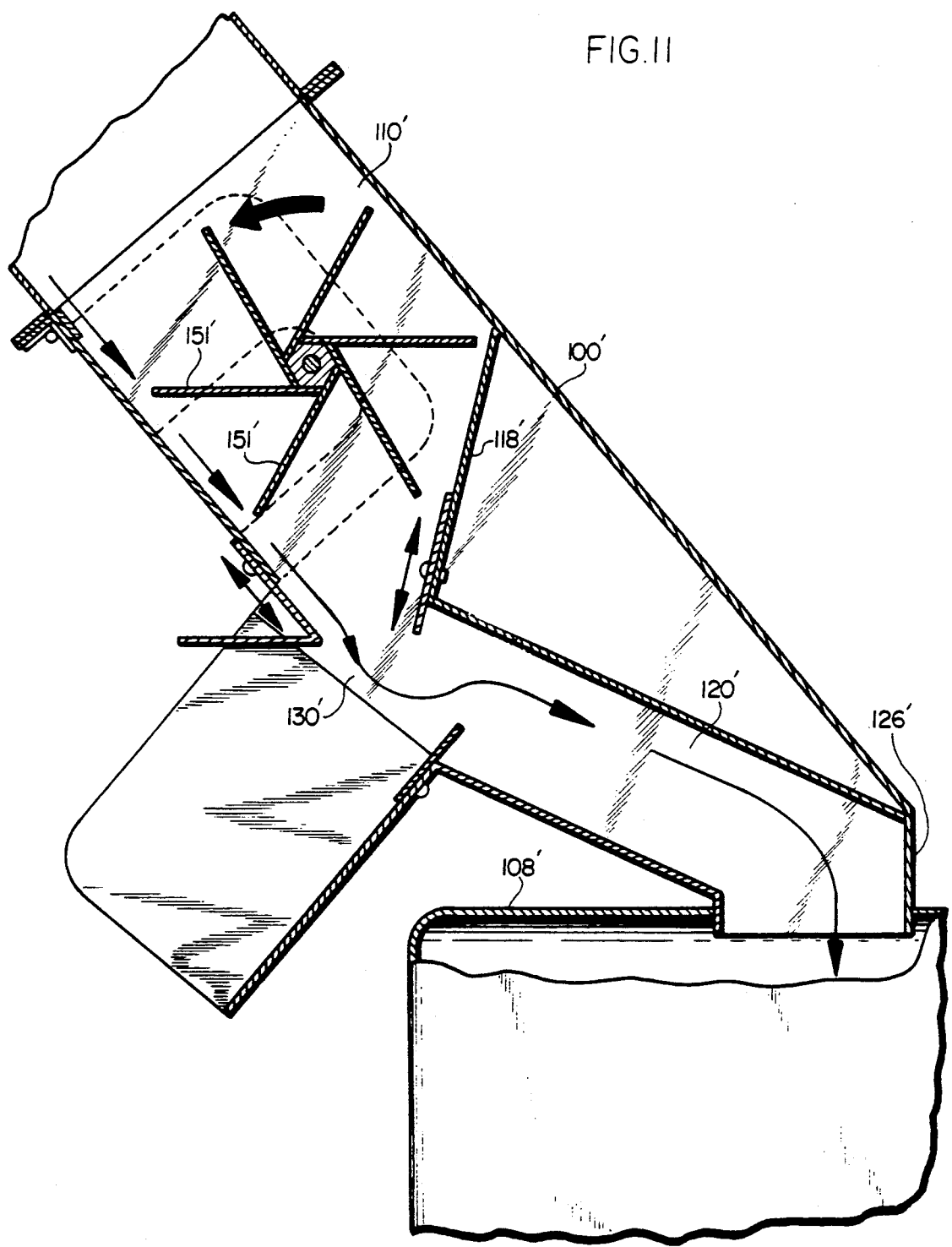

FIGS. 7-11 show yet another embodiment of the invention of the present invention. FIG. 7 shows parts separator device 100 having ends 101, 102. Separator material receiving end 101, flanged at 104, is connected to flange 105 of a conventional conveyor means 107 which conveys materials and lubricant to parts separator exit 100. Separator end 102 is spaced from conical guide cone in centrifuge 108. Parts separator device 100 comprises a first chute member 110 which extends in a first direction from the receiving end 101 and a second chute member 120 which extends in the first direction and is positioned contiguous to the dropout opening at the exit end of first chute 110 as seen in FIGS. 9 and 11.

First chute member 110 comprises side walls 114, 115, top wall 117, angled top wall 118 and bottom wall 119. Second chute member 120 is disposed at an angle B from the first chute member of approximately 30°. Member 120 is formed by side walls 114, 115, bottom wall 121 and top wall 123. End 124 of top wall 123 contacts wall 118 while the remaining top wall end 125 contacts tubular chute 126.

It will be noted that in this particular embodiment, top wall 117 extends along the top of first chute member 110 and continues past wall 118 to terminate at tubular chute 126. Tubular chute 126 also contacts an end of bottom wall 121 with tubular chute 126 being spaced from the centrifuge guide cone.

A material drop-out opening 130 is formed between bottom walls 119 and 121. The second chute member 120 extends outwardly away from the first chute member 110 to form a space between the drop-out opening at the exit end of the first chute member and the receiving end of the second chute member with at least a portion of the space being viewable by a viewer as seen, for example, in FIGS. 2, 4, 6, 9 and 11.

Catch means 131 comprises a substantially U-shaped sheet metal member and includes spaced side walls 132 connected to bottom wall 133. Side walls 132 depend from and are coextensive with side walls 114, 115 while bottom wall 133 depends from one end of bottom wall 121. If desired, the length and width of catch means 131 could be varied depending upon a particular application. Catch means 131 receives materials separated from chip materials and lubricant being fed to centrifuge 108 through the second chute member.

An angled first baffle plate 141 comprising angled legs 142, 143 is adjustably mounted by suitable fastener means 145 to bottom wall 119. The fastener means serves to permit plate 141 to be adjustably positioned along bottom wall 118, plate 141 serving to move in the direction of arrows "a" for increasing or decreasing the size of drop-out opening 130.

A second baffle plate 146 is adjustably mounted on angled wall 118 by suitable fastener means 147. Baffle plate 146 is adapted to move in the direction indicated by arrows "b" to increase or decrease the size of the entrance opening in second chute member 120 and the size of the exit material drop-out opening in first chute member 110.

A third baffle plate 148 is adjustably mounted on bottom catch wall 133 by suitable fastener means 149. Baffle plate 148 is adapted to move in the direction indicated by arrows "c" to increase or decrease the size of the opening at the receiving end of second chute member 120. The fastening means for the sheet metal baffle plates can be any conventional screw type fastener that can be threaded into the various walls to permit the respective baffle plates to be readily and easily adjusted along the length of the wall on which they are seated.

A rotary air-seal assembly 150 disposed in first chute member 110 is positioned approximately midpoint along the length of bottom wall 119. Assembly 150 comprises a plurality of equally-spaced, relatively stiff but flexible paddle wheel blades 151 connected to hub 152. Hub 152 is positioned on rotatable shaft 153 connected to suitable bearings 154 which, in turn, are connected to side walls 114, 115. Shaft 153 is connected to motor 156 or other suitable drive means which serves to drive the paddle wheel blades in a counterclockwise direction. The outer edges of blades 151 are spaced a short distance from walls 117, 118, 119 such that while the blades serve to act as a seal to some degree, the blades also serve to contact material in chute 110 and assist it as it slides along bottom wall 119 for the purpose of increasing the speed or momentum of the material as the material approaches drop-out opening 130.

A mounting bracket member 160 depends from bottom wall 119. Member 160 includes angled top plate 161 depending arms 162, 163 and bottom plate 164. A conventional blower device 170 having a motor 171 and an air chute 172 is mounted on the bottom plate 164. An air flow having a positive pressure is generated by the blower whereby air is blown across drop-out opening 130 and second chute member 120 to pass entrained metal chips or lubricant along the length of chute 120, through tubular chute 126 to centrifuge 108.

Material to be separated passes from conveyor 107 into first chute member 110. The material slides down the top surface of bottom wall 119 and gains momentum as paddle wheel blades 151 contact the material and push it toward drop-out opening 130. Heavy, undesired material is separated out and falls out of opening 130 into catch means 131 whereas the remaining metal chips and lubricant, which are entrained in the air flow generated by blower 170 enter the receiving end of second chute member 112 and, are transported along the length of second chute member 120 in the direction of the arrows "d" shown in FIG. 9 where they ultimately exit into centrifuge 108.

If desired, blower 170 shown in the embodiment of FIG. 9 can be eliminated. Instead, tubular chute 126' can be connected directly to centrifuge 108' shown in FIG. 11 where the embodiment, but for the use of the centrifuge and a modified paddle wheel assembly, is the same as in FIG. 9 and similar parts are marked with prime following the numeral. The air necessary to carry out both the desired separation at drop-out opening 130' and the carrying of entrained metal chips and air through second chute 120' is created by action of the rotating blades in centrifuge 108'. In this embodiment, it is appreciated the air pressure in at least the second chute is a negative pressure. Moreover, it is appreciated that the length of paddle wheel blades 151' will be extended to contact the top and bottom walls of the first chute member to preclude any substantial amount of air from being pulled into drop-out opening 130'.

The embodiments of FIGS. 7–11, like the embodiments of FIGS. 1–6, permit separation of heavy materials from the entrained chip and lubricant to occur at the drop-out opening whereby the separation is viewable by an operator.

While one or more embodiments of the invention have been herein illustrated and described in detail, it will be understood that modifications and variations thereof may be effected without departing from the spirit of the invention and the scope of the appended claims.

What is claimed is:

1. Apparatus for separating heavy, undesired materials form lighter chip materials and lubricant, said apparatus comprising:
    a first chute member and a second chute member disposed contiguous to said first chute member;
    said first chute member including a first and second end separated by a bottom wall, said first chute member first end being a receiving end for receiving materials to be separated;
    said first chute extending in a first direction from said receiving end to said second end;
    said first chute member having a material drop-out opening which is spaced away form said first chute member receiving end and is located along the bottom wall of said first chute member;
    said second chute member having an entrance end and an exit end, said second chute member entrance end being disposed at least partially below said first chute member drop-out opening and at least a portion of said drop-out opening being exposed to a viewer;
    said second chute member extending in said first direction from said entrance end of said second chute and extending outwardly away from said first chute member drop-out opening to form a space between the drop-out opening and the second chute entrance end with at least a portion of said space being viewable by a viewer;
    said second chute member further comprising a top wall, bottom wall and spaced side walls connected to said top and bottom walls to form a chute closed substantially along the length thereof;
    means for permitting a substantial portion of the material in the first chute member to exit through said drop-out opening; and,
    fluid generating means for creating a substantial fluid pressure across said drop-out opening and said space sufficient to permit undesired heavy materials to drop from the materials at the location of said drop-out opening and space and to transport the remaining entrained chip material and lubricant into the entrance end of said second chute member and along the length of said substantially closed second chute member whereby substantial material separation occurs in said space below said drop-out opening and said separation is substantially completed prior to said entrained separated material chips and lubricant entering said second chute member.

2. Apparatus in accordance with claim 1 and further including a material catch means disposed below said drop-out opening for receiving separated material.

3. Apparatus in accordance with claim 1 wherein said fluid generating means comprises a blower means connected to said apparatus, said blower means being positioned contiguous to and below said drop-out opening for creating a positive fluid pressure across said drop-out opening and along the length of said second chute member.

4. Apparatus in accordance with claim 1 wherein said fluid generating means is a centrifuge means positioned contiguous to the exit end of said second chute member for creating a negative fluid pressure along the length of said second chute member and across said drop-out opening.

5. Apparatus for separating heavy, undesired materials from lighter chip materials and lubricant in accordance with claim 1 wherein said first chute member includes means for causing a material separation to occur within said first chute member prior to material passing through said drop-out opening; and,
    a storage area associated with said first chute member to receive material separated from material which subsequently passes to said drop-out opening.

6. Apparatus in accordance with claim 5 wherein said means for causing a material separation includes an arcuate-shaped member located on said bottom wall at the exit end of said first chute member which arcuate shape is sufficient to direct undesired materials over said drop-out opening into said first chute member storage area.

7. Apparatus in accordance with claim 6 wherein said first chute member is open for a substantial portion along the top of the chute member to permit viewing of material inside said first chute member as it approaches said drop-out opening.

8. Apparatus in accordance with claim 7 where a removable perforated plate is disposed over the opening in the top of said first chute member.

9. Apparatus in accordance with claim 1 and further including fluid seal means for substantially precluding fluid from being drawn to said drop-out opening through said first chute member.

10. Apparatus in accordance with claim 9 wherein said fluid seal means includes a rotary seal disposed within said first chute.

11. Separator apparatus in accordance with claim 10 wherein said top wall of said first chute member is closed at least at the location of the rotary air seal means.

12. Separator apparatus in accordance with claim 1 where said first and second chute members are substantially rectangular in shape along the respective length of each chute member.

13. Separator apparatus in accordance with claim 1 and further including baffle means for adjusting the opening to said entrance end of said second chute member.

14. Separator apparatus in accordance with claim 1 and further including baffle means for adjusting the size of said drop-out opening.

15. Apparatus in accordance with claim 1 wherein said first chute member is free of any substantial fluid pressure generated by said fluid generating means.

16. Apparatus for separating heavy, undesired materials from lighter chip materials and lubricant, said apparatus comprising:
   a first chute member and a second chute member disposed contiguous to first chute member;
   said first chute member including two spaced ends, a bottom wall, a first top wall, a second wall connected to and angled from said top wall and spaced side walls;
   said bottom wall and said angled wall being spaced from each other to form a material drop-out opening at the exit end of said first chute member;
   one of said first chute member ends being a receiving end for receiving materials to be separated and said second end being an exit end for material to be separated;
   said second chute member being disposed at least partially below said first chute member and having two ends;
   said second chute further comprising a top wall, bottom wall and spaced side walls connected to said top and bottom walls to form a chute closed substantially along the length thereof;
   said drop-out opening being located contiguous to the entrance end of said second chute; and,
   fluid generating means for creating a substantial fluid pressure across said drop-out opening sufficient to permit undesired heavy materials to drop from said drop-out opening and to entrain and transport the remaining chip material and lubricant along the length of said substantially closed second chute whereby material separation occurs below said drop-out opening and is substantially completed prior to entrained separated material chips and lubricant entering said second chute.

17. Apparatus in accordance with claim 16 and further including a material catch means disposed below said drop-out opening for receiving separated material.

18. Apparatus in accordance with claim 16 and further including a blower means disposed adjacent said drop out opening for generating a positive fluid pressure across said opening and along the length of said second chute member.

19. Apparatus in accordance with claim 16 and further including a centrifuge connected to said exit end of said second chute for generating a negative fluid pressure across said drop-out opening and along the length of said second chute member.

20. Apparatus in accordance with claim 16 and further including a rotary paddle wheel means which includes a plurality of blades for assisting the movement and increasing the momentum of material and lubricant to be separated as the material and lubricant move from the entrance end to the exit end of said first chute member.

21. Apparatus in accordance with claim 20 wherein said rotary paddle wheel means include means for serving as an air-seal in said first chute member.

22. Apparatus in accordance with claim 16 and further including a, first baffle means for increasing or decreasing the size of said drop-out opening.

23. Apparatus in accordance with claim 16 wherein said first baffle means is adjustably connected to the bottom wall of said first chute member.

24. Apparatus in accordance with claim 23 and further including a second baffle means for increasing or decreasing the size of said entrance opening in said chute member.

25. Apparatus in accordance with claim 24 wherein said second baffle means is adjustably connected to said angled wall of said first chute member.

26. Apparatus in accordance with claim 25 wherein said second baffle means further includes a baffle plate adjustably connected to said catch means.

* * * * *